W. F. BOSTOCK.
COMPOSITE SOLE.
APPLICATION FILED FEB. 25, 1914.
1,162,445.
Patented Nov. 30, 1915.
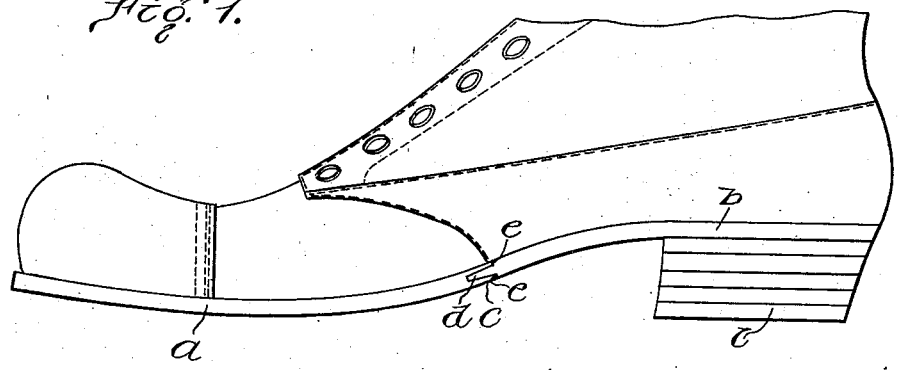
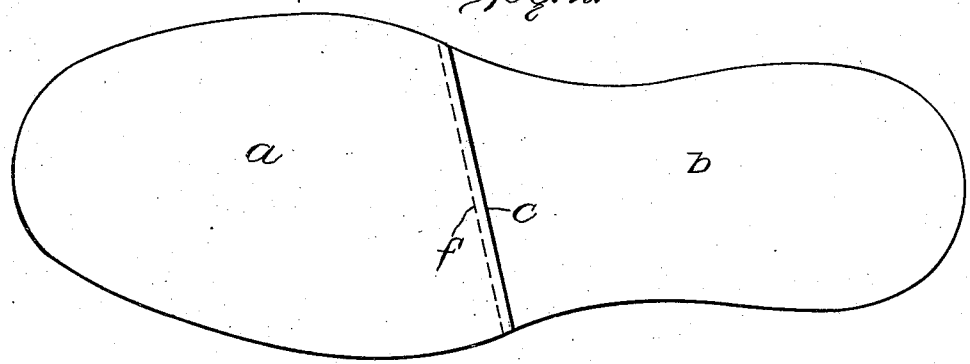
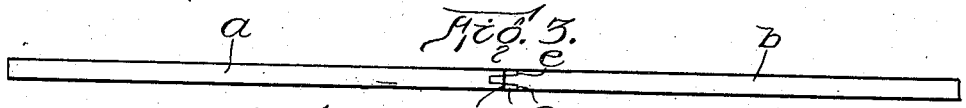
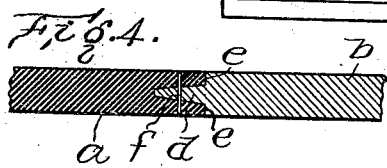
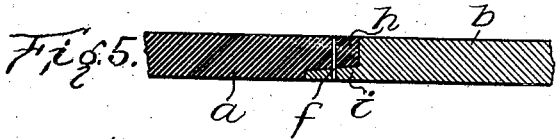
Witnesses:
Inventor:
W. F. Bostock

UNITED STATES PATENT OFFICE.

WILLIAM F. BOSTOCK, OF PROVIDENCE, RHODE ISLAND, ASSIGNOR TO WILLIAMS-KNEELAND COMPANY, OF BRAINTREE, MASSACHUSETTS, A CORPORATION OF MASSACHUSETTS.

COMPOSITE SOLE.

1,162,445. Specification of Letters Patent. Patented Nov. 30, 1915.

Application filed February 25, 1914. Serial No. 820,853.

*To all whom it may concern:*

Be it known that I, WILLIAM F. BOSTOCK, a citizen of the United States, and resident of Providence, in the county of Providence and State of Rhode Island, have invented certain new and useful Improvements in Composite Soles, of which the following is a specification.

The present invention relates to a sole for boots and shoes having all the desirable features of a rubber sole with none of the defects of a rubber sole, and one which can be produced with a saving in cost. The sole which I have produced as the result of the present invention is intended to be incorporated in a shoe of any construction or character.

All the advantages and desirable features inherent in a rubber sole applied to a shoe which has also a heel, reside entirely in the tread portion of the sole, that is, the portion which comes in contact with the ground when the shoe is worn. The rubber shank and heel portions of a sole which is made entirely of rubber have no advantages or special utility and add nothing to the practical value or desirable qualities of the shoe. On the contrary the shank part of an all-rubber sole is a positive detriment, because it is liable to chip on the edges and to be cut by the stitches or other attaching means employed to fasten it to the shoe. In practice all-rubber soles are usually made thinner at the shank than at the tread part in order to save material and reduce the cost of the sole, because the wear on the shank part is inappreciable as compared with the wear on the tread part under ordinary conditions of use of the shoe. This practice of making the shank thinner than the tread is a source of trouble to the shoe manufacturer on account of the greater liability of the rubber being injured either in course of being attached to the shoe or in the finishing operations, and in the manufacture of such shoes the percentage of shoes spoiled or damaged (such shoes being technically known as "cripples") from this cause is large.

My invention has for its object to produce a sole possessing all the desirable qualities and free from all the objectionable features of the all-rubber sole, and one which may be produced at a cost less than the cost of production of the all-rubber sole.

Briefly stated my invention consists in a sole of which the tread portion is entirely of rubber or rubber composition, and the shank or rear part is of a different material having greater strength and toughness than the rubber and being also less expensive.

In the accompanying drawings, Figure 1 is a side view of a shoe of which the sole embodies my invention. Fig. 2 is a plan view of a shoe sole embodying my invention. Fig. 3 is a side elevation of the sole shown in Fig. 2. Fig. 4 is a detailed sectional view on an enlarged scale of the joint or connection between the two parts of the sole illustrated in Figs. 1, 2, and 3. Figs. 5 and 6 are views similar to Fig. 4 showing other forms of connection between the two parts of the sole. Fig. 7 is a view illustrating my invention applied to a half sole or tap.

The same reference characters indicate the same parts in all the figures.

A sole made according to my invention consists of at least two pieces, although it may be made of more than two if desired. Such pieces comprise essentially a fore part or tread portion $a$ and a rear part or shank portion $b$. Said shank portion may be made in one piece with the heel part of the sole as here shown, but it would not be a departure from the invention to make the heel part as a piece separate from the shank part or to have the rear termination of the sole at a point short of the heel of the shoe whereto the sole is applied. The fore part or tread portion $a$ is made of rubber, or a composition including rubber, or equivalent material, suitable for resilient antifriction soles. I will state that the term "rubber" as used in this description and in the following claims is used with its popular meaning as including any material composed wholly or in part of rubber gum or caoutchouc, or any equivalent material having qualities similar to those of rubber, of elasticity and resilience and high coefficient of friction, which are or may be suitable for making shoe soles. The rear part or shank portion $b$ is made of a different material which is tougher and stronger than rubber, and is preferably leather. In thus defining the material of which I prefer to make the shank portion of the sole I have not intended to limit my invention to this material alone or to imply that other materials such as leather board, woven fabrics, or anything else suitable for the purpose, may not be used. In the remainder of this description I will refer to the shank portion as being of leather, without intending thereby to limit the invention further than as above indicated.

An important feature of the sole is that the rubber tread portion extends entirely across the sole from edge to edge and it extends in a forward and rearward direction to the extreme limits of that portion of the sole which comes in contact with the ground in use. The rubber and leather portions are connected by a joint $c$ extending transversely of the sole at a point, which, when the sole is shaped and applied to a shoe, is raised above the ground level. That is, the joint $c$ is in rear of and above the area of contact of the sole with the ground, so that it is not subject to wear and does not lessen the elasticity and resistance of the tread.

The joint between the rubber and leather portions of the sole may be made in various ways, three of which are illustrated in the drawings. In Figs. 1 to 4 the rubber piece is molded with a groove in its rear edge and the leather piece is cut to form a tongue $d$ between shoulders $e$, the tongue being of such proportions as to fit in the groove of the rubber part. Preferably the parts are cemented before the tongue is thus inserted and after insertion the parts are stitched together, the stitches of the seam being shown at $f$. Any character of stitching may be employed.

Another form of joint is shown in Fig. 5, where the parts are scarfed or molded to form a lip $h$ on the rubber part which overlies a lip $i$ on the leather. The overlapping lips are cemented and stitched together as before. Fig. 6 shows a reversal of the joint shown in Fig. 4, in this case the rubber part having a tongue $k$ entering a groove between lips $d'$ and $d^2$ of the leather part. In some respects the joint last described is preferable to the others in that the rubber tongue is protected by two leather lips which prevent the stitches of the securing seam from cutting the rubber. The joint shown in Fig. 4 is, however, simpler to produce, since it is easier to skive the leather to form a central tongue $d$ than to groove leather and make two tongues $d'$ and $d^2$, while it is equally as easy to mold rubber with a recessed groove as with a projecting tongue. It will be noted that all forms of the joint illustrated are formed by overlapping lips on the rubber and leather parts respectively, one form having two lips on the rubber and one on the leather, the second having one lip on each, and the third having one lip on the rubber piece and two lips on the leather piece. The material adjacent the lips is preferably so recessed or shouldered or scarfed to their thin edges that the pieces are matched together with their corresponding surfaces in approximately the same planes.

I have previously referred to the fact that an all-rubber sole is liable to become chipped and to break away at the shank of the shoe to which it is attached. A sole made in accordance with my invention is free from this defect, since the leather shank is tougher and stronger than rubber, is not cut by the stitches or other devices which secure the sole to the shoe, and does not chip or crumble. The use of leather has the further advantages that it makes the sole lighter, which is a great advantage, and reduces the cost of the sole, being less expensive than rubber. As there is no appreciable wear or strain on the shank part of the sole, the leather used may be of the cheaper grades. Even inferior leather is not liable to be cut and chipped in the processes of shoe manufacture. Thus the cost of making shoes equipped with my soles is diminished, not only on account of the small cost of the soles but also because the proportion of "cripples" is less.

A sole made in accordance with my invention may be applied to a shoe by any of the common methods. To a shoe so made a heel $l$ may be fastened in the usual manner. There is no necessity for employing hand work or taking any special care in attaching my composite sole to a shoe, as there is in the case of an all-rubber sole.

The invention may also be incorporated in a half sole, or tap, which may be used in repairing partially worn out shoes or for providing an outside rubber tap on a leather shoe. This half sole is essentially the same as the complete sole illustrated in Figs. 1 to 6 and differs only in that the shank portion is shortened to a length merely sufficient to secure the nails or other attaching means which will be used in securing the shank end of the tap to the shoe. Such a rubber half sole may be employed in repairing a shoe when the rubber tread of the sole has become worn out, and it may also be applied to a shoe which when first manufactured had a sole entirely of leather, for the purpose of providing such a shoe with an outside rubber tap. With rubber soled shoes as heretofore manufactured the method of repairing when the tread part of the sole is worn out is to strip off the entire sole and substitute an entire new rubber sole which has a shank part as well as a tread part, resulting in waste of the rubber which formed the shank part of the worn out sole. This method of repairing is necessary because heretofore no half sole or tap of rubber has ever been produced which can be applied and secured to a partially worn out shoe. My improved tap sole can be stitched around its edges to the welt or the edge of the old sole and at the shank end can be secured by tacks or nails driven through the leather strip and clenched in the inner sole. The tap can be thus applied as well to an all-leather shoe as to one which was manufactured with a whole rubber sole.

The entire sole illustrated in Figs. 1 to 6 and the half sole illustrated in Fig. 7 are alike in this, that each has a forepart or tread portion of rubber and a shank portion of leather or other material which is stronger and tougher than rubber. The term "shank portion" as used in this specification and in the following claims is intended to describe not only a part of the sole long enough to underlie the entire shank and heel of the shoe, but also a strip as short as the leather strip shown in Fig. 7 which is attached to the rubber at the shank end of the half sole.

One of the most important features of the sole made as above described is that the entire tread portion is of rubber and extends across the full width of the sole, so that nowhere does leather form any part of the tread surface. I am aware that heretofore attempts have been made to attach rubber taps to shoes by binders or strips of leather overlying portions of the rubber tap. In all such prior attempts the leather binders occupy part of the tread portion of the sole, and come into contact with the ground at the same time that the rubber does, thus limiting and more or less destroying the desired resilient and anti-slipping characteristics of the sole.

In each form of the sole hereinbefore illustrated and described, the shank portion, whether the same is a complete shank as indicated in Figs. 1 to 6 inclusive, or an abbreviated shank portion as shown in Fig. 7, is of a non-metallic material which is stronger and tougher than the rubber composition used for the tread part of the sole, and is at the same time flexible so that it may be curved to conform with the convex curvature usually present in the shank portions of shoes, and is sufficiently soft or penetrable to permit of being penetrated by the needle of a sewing machine. Thus my sole, whether made as the entire sole, or as a tap sole for repair work, may be stitched to a Goodyear shoe and the extremities of the non-metallic shank portion may be penetrated by the needle of the sewing machine and held close up against the welt or the upper of the shoe by the same line of stitches which passes along the edge portion of the rubber tread for uniting the latter to the welt. This statement is true as to each of the materials hereinbefore named as suitable and within my contemplation for constituting the shank portion of the sole. It will be noted also that in each illustrated embodiment of the invention the shank portion of the composite sole is attached to the rubber part of the sole on a line which is in rear of the part thereof which is subjected to wear. It is also to be noted that each of the materials heretofore named from which the shank part of the composite sole may be produced, is of a fibrous nature which is capable of being securely and permanently united to the rubber composition of which the fore part of the sole is made by vulcanization.

What I claim and desire to secure by Letters Patent is:—

1. A composite sole having a tread portion of rubber the tread surface of which extends from edge to edge of the sole, and a shank portion of a non-metallic material stronger and tougher than rubber connected directly to the rubber.

2. A composite sole having a tread portion of rubber the tread surface of which extends from edge to edge of the sole, and a shank portion of a non-metallic material stronger and tougher than rubber, said portions being lapped and joined directly together on a transverse line.

3. A composite sole having a tread portion of rubber the tread surface of which extends from edge to edge of the sole, and a shank portion of a non-metallic material stronger and tougher than rubber, said portions being directly connected together by a transverse seam.

4. A composite sole having a tread portion of rubber extending from edge to edge, and a shank portion of a non-metallic material stronger and tougher than rubber, said portions being scarfed to provide overlapping lips, and the lip of one portion being lapped over the lip of the other portion and stitched directly thereto.

5. A composite sole having a tread portion of rubber extending from edge to edge, and a shank portion of a non-metallic material stronger and tougher than rubber, said portions being scarfed to provide overlapping lips, and the lip of one portion being lapped over the lip of the other portion and cemented directly thereto.

6. A composite sole having a tread portion of rubber extending from edge to edge, and a shank portion of a non-metallic material stronger and tougher than rubber, said portions being scarfed to provide overlapping lips, and the lip of one portion being lapped over the lip of the other portion and united directly thereto by adhesive and stitches.

7. A composite sole comprising a tread portion composed entirely of rubber composition, and a shank portion of leather joined directly to said tread portion on a line which lies in rear of and above the tread surface of the sole when the latter is incorporated in the shoe.

8. A composite sole comprising a rubber fore part and a leather shank part, the said rubber part being of the full width of the sole, and the rubber and leather parts being joined directly together on a line which extends from edge to edge of the sole.

9. A composite sole comprising a rubber tread portion and a leather shank portion, said portions having lips matched together and overlapping and being stitched directly together, the joint between said parts extending from edge to edge of the sole at a point back of any part of the sole which comes in contact with the ground when the sole is applied to a shoe.

10. A sole consisting of a tread piece of rubber composition extending the full width of the sole and toward the shank beyond the portion which is subjected to wear, and a piece of flexible material having greater toughness than the rubber composition, and sufficiently soft to permit ready penetration by a needle attached directly to the shank end of such composition piece.

11. A sole consisting of a tread portion of rubber composition and a shank portion of a non-metallic flexible material having greater cohesive strength than the rubber composition and being of a fibrous character suitable for union by vulcanization to the rubber composition, such shank extending across the entire width of the tread portion and being firmly united thereto at the shank end thereof, and the rubber composition of which the thread portion is made continuing throughout the entire width of the sole.

12. A two part outer sole for shoes the fore part of which is of rubber and the rear part of leather, said rear part substantially spanning the shank of the sole longitudinally thereof and the two parts being permanently and rigidly secured together at their juncture.

13. A two part outer sole for shoes the fore part of which is of rubber and the rear part of leather, said rear part substantially spanning the shank of the sole longitudinally thereof and the two parts having a lapped joint and being permanently and rigidly secured together at their juncture.

14. A two part outer sole for shoes the fore part of which is of rubber and the rear part of leather, said rear part substantially spanning the shank of the sole longitudinally thereof and the two parts having a lapped joint wherein the rear part is on the outside and being permanently and rigidly secured together at their juncture by stitching.

15. A shoe comprising a two part outer sole the fore part of which is of rubber and the rear part of leather, said rear part substantially spanning the shank of the shoe longitudinally thereof and the two parts being permanently and rigidly secured together at their juncture.

16. A shoe comprising a two part outer sole the fore part of which is of rubber and the rear part of leather, said rear part substantially spanning the shank of the shoe longitudinally thereof and the two parts having a lapped joint and being permanently and rigidly secured together at their juncture.

17. A shoe comprising a two part outer sole the fore part of which is of rubber and the rear part of leather, said rear part substantially spanning the shank of the shoe longitudinally thereof and the two parts having a lapped joint wherein the rear part is on the outside and being permanently and rigidly secured together at their juncture by stitching.

In testimony whereof I have affixed my signature, in presence of two witnesses.

WILLIAM F. BOSTOCK.

Witnesses:
ARTHUR H. BROWN,
P. W. PEZZETTI.

It is hereby certified that in Letters Patent No. 1,162,445, granted November 30, 1915, upon the application of William F. Bostock, of Providence, Rhode Island, for an improvement in "Composite Soles," an error appears in the printed specification requiring correction as follows: Page 4, line 42, claim 11, for the word "thread" read *tread;* and that the said Letters Patent should be read with this correction therein that the same may conform to the record of the case in the Patent Office.

Signed and sealed this 18th day of January, A. D., 1916.

[SEAL.]

J. T. NEWTON,
*Acting Commissioner of Patents.*

Cl. 36—31.